United States Patent [19]

Wing

[11] 4,287,077
[45] Sep. 1, 1981

[54] GLYCOL COMPOSITIONS CONTAINING AN ETHER MODIFIED SILICONE TO INHIBIT GELLING

[75] Inventor: Phillip L. Wing, Lake Jackson, Tex.

[73] Assignee: The Dow Chemical Company, Midland, Mich.

[21] Appl. No.: 191,798

[22] Filed: Sep. 29, 1980

Related U.S. Application Data

[63] Continuation-in-part of Ser. No. 96,874, Nov. 23, 1979, abandoned.

[51] Int. Cl.³ ............................................. C09K 5/00
[52] U.S. Cl. ...................................................... 252/75
[58] Field of Search ...................................... 252/75, 74

[56] References Cited

U.S. PATENT DOCUMENTS

| | | | |
|---|---|---|---|
| 2,693,451 | 11/1954 | Heisig | 252/75 |
| 3,265,623 | 8/1966 | Pines et al. | 252/75 |
| 4,149,985 | 4/1979 | Wilson | 252/75 X |
| 4,210,548 | 7/1980 | Hirozawa et al. | 252/75 X |

Primary Examiner—Harris A. Pitlick
Attorney, Agent, or Firm—B. G. Colley

[57] ABSTRACT

Gellation resistant aqueous glycol and glycol ether compositions useful as antifreeze compositions are disclosed containing silicates together with other corrosion inhibitors. The silicates are added to the glycol compositions after the other additives have been added and after the composition has been adjusted to a pH range of 7-12. The gellation resistance is obtained or enhanced by the addition of an effective amount of a glycol soluble ether modified silicone having the repeating units

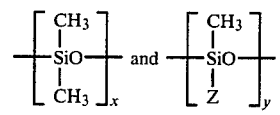

wherein
x has an average value range from 1.8 to 6.8
y has an average value range from 1 to 4
Z has the formula

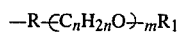

where
n is 2 or 3
m has an average value such that the average molecular weight of the polyoxyalkylene chain is in the range 100–400
R is an alkylene chain of 2-4 carbons and
$R_1$ is selected from the group consisting of hydrogen and alkyl groups of 1–4 carbons.

11 Claims, No Drawings

GLYCOL COMPOSITIONS CONTAINING AN ETHER MODIFIED SILICONE TO INHIBIT GELLING

CROSS REFERENCE TO RELATED APPLICATION

This is a continuation-in-part of Ser. No. 96,874, filed Nov. 23, 1979 now abandoned.

BACKGROUND OF THE INVENTION

The present invention provides a gellation resistant aqueous glycol or glycol ether composition.

Antifreeze compositions containing glycols and various corrosion inhibitors are well known in the prior art as is illustrated by U.S. Pat. Nos. 3,282,846, dated Nov. 1, 1966, and 3,362,910 dated Jan. 9, 1968. The use of the relatively inexpensive and effective borax and silicates in glycol formulations is well illustrated by these patents. It is conventional in this art to make a glycol concentrate which is then sold to end users for use as a coolant in automotive radiators and the like after dilution with water.

In the past, it has been found that glycol concentrates prepared using conventional corrosion inhibitors such as borax and silicates had a tendency to develop irreversible silicate gels upon standing for a period of time in a warehouse or store. The end user, when he attempted to pour the glycol concentrate into his automotive radiator found that the concentrate had developed "slugs" or gels which either did not pour readily or which tumbled out in discrete masses along with the liquid. The present invention was developed to eliminate this gel formation.

In U.S. Pat. No. 3,312,622, dated 4-4-67, there is disclosed a corrosion resistant glycol composition containing an organo-silicon copolymer having carboxylate salt groups and silicate groups.

In U.S. Pat. No. 4,149,985 dated 4-17-79, there is disclosed that a gellation resistant glycol composition containing borate and silicate additives can be made wherein the order of addition of the additives and the pH of the solution is closely controlled in order to obtain the gellation resistant formulation.

In Ser. No. 939,100, filed Sept. 1, 1978, now abandoned there is disclosed the use of a small but effective amount of the hydrolyzate of organo phosphorous silicon compounds to inhibit the gellation of glycol compositions these silicon compounds have the formula:

$$(RO)_3Si(CH_2)_nO-P(O)(CH_3)-OR$$

wherein R is an alkyl group of 1-4 carbons and n is an integer of 1-4.

While these hydrolyzate compounds have proved to be effective they are expensive and/or difficult to obtain.

SUMMARY OF THE INVENTION

It has now been discovered that the shelf life or gellation resistance of single phase aqueous glycol or glycol ether compositions can be improved by the addition to the glycol compositions of a small but effective amount of a glycol soluble ether modified silicone having the repeating units

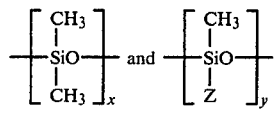

wherein
x has an average value range from 1.8 to 6.8
y has an average value range from 1 to 4
Z has the formula

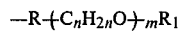

wherein
n is 2 or 3
m has an average value such that the average molecular weight of the polyoxyalkylene chain is in the range 100-400
R is an alkylene chain of 2-4 carbons and
$R_1$ is selected from the group consisting of hydrogen and alkyl groups of 1-4 carbons This anti-gellation additive is relatively cheap and effective in the presence of the other well-known corrosion inhibitors generally present in such compositions such as alkali metal silicates, borates, tolyltriazoles, mercaptobenzotriazoles, nitrates, nitrites, phosphates, benzoates and the like.

The present invention is an aqueous composition comprising
(A) 85 to 98 percent by weight of an alkylene glycol, an alkylene glycol ether, or mixtures thereof,
(B) an effective amount to reduce corrosion of an alkali metal silicate,
(C) an effective amount to improve gellation resistance of a glycol soluble ether modified silicone copolymer comprising the repeating units

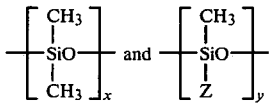

wherein
x has an average value range from 1.8 to 6.8
y has an average value range from 1 to 4
Z has the formula

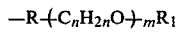

where
n is 2 or 3
m has an average value such that the average molecular weight of the polyoxyalkylene chain is in the range 100-400
R is an alkylene chain of 2-4 carbons
$R_1$ is selected from the group consisting of hydrogen and alkyl groups of 1-4 carbons, and
(E) the remainder being water and an effective amount of one or more other corrosion inhibitors.

DETAILED DESCRIPTION OF THE INVENTION

The glycols and glycol ethers which can be used in the present composition are (1) glycols such as ethylene glycol, diethylene glycol, propylene glycol, dipropylene glycol, (2) glycol monoethers such as the methyl, ethyl propyl and butyl ether of ethylene glycol, diethylene glycol, propylene glycol and dipropylene glycol, and (3) glycol diethers such as the methyl and ethyl diethers of ethylene glycol, diethylene glycol, and dipropylene glycol.

Ethylene glycol and the monomethyl ether of propylene glycol, i.e., methoxy propanol are particularly preferred.

The following are examples of known corrosion inhibitors and additives which can be used in the present invention.

Alkali metal silicates such as sodium metasilicate, potassium metasilicate, lithium metasilicate, and the like.

Alkali metal borates such as sodium tetraborate, potassium tetraborate, sodium metaborate, and potassium metaborate.

Alkali metal mercaptobenzotriazoles, and alkali metal tolyltriazoles.

Alkali metal nitrates such as sodium nitrate, potassium nitrate, and alkali metal nitrites such as potassium and sodium nitrite.

Alkali metal phosphates such as sodium phosphate and potassium phosphate, alkali metal benzoates, and various antifoams and dyes if desired.

In the process of making the compositions of this invention, one or more of the above glycols are mixed with one of the above non-silicate corrosion inhibitors and sufficient amounts of other inhibitors such as mercaptobenzothiazoles, tolyltriazoles, nitrates, and phosphate inhibitors necessary for corrosion protection. An effective amount of the above silicone is added next. The pH of the solution is then adjusted to the desired pH range of 7-12, and preferably 9-11.0, by adding a basic inorganic compound in aqueous solution such as an alkali metal hydroxide, carbonate, or phosphate. One of the above alkali metal silicates is then added to produce a corrosion and gellation resistant glycol composition.

For the purposes of this invention, an effective amount of the silicone which will give a gellation resistant glycol composition is an amount ranging from about 0.001 to about 1.0 percent by weight and preferrably in the range from 0.01 to 0.025 percent by weight based on the total weight of the composition.

The use of the above corrosion inhibitors when used in a corrosion inhibiting amount is well known in the prior art. Of course, this amount will vary for each inhibitor but in general the amounts used for the silicates and borates are:

0.025 to 1.0 percent by weight based on the total solution weight of silicates and 0.1 to 2.0 percent by weight of borates. Preferrably, these ranges are 0.05 to 0.50 percent for the silicates and 0.5 to 1.5 percent for the borates.

In this invention, it has been found that when the borate levels are at the higher end of the desired range (0.5 to 2.0 percent by weight), the amount of silicate that can be added must be in the lower end of the desired range of silicate level (0.025 to 0.3 percent by weight). It is not possible to set forth exactly the amount of silicate to be used in each instance due to the complicating influence of the other corrosion inhibitors such as the aforementioned triazoles, nitrates, nitrites, and phosphates. However, one can by a simple accelerated aging test determine the amount of silicate which when added will give the desired gellation resistance.

An accelerated aging test was used in the examples and controls that follow to estimate the shelf life of the compositions. It was performed by placing a sample of the glycol composition in an oven controlled at 150° F. (66° C.) and measuring the number of hours or days before the composition begins to gel. By comparing the room temperature (25° C.) aging of the same samples, it has been found that one day at 150° F. (66° C.) is approximately equal to one month at room temperature (77° F. or 25° C.).

The silicone compounds used herein can be prepared by reacting a poly (dimethyl) siloxane having an average molecular weight of 200 to 500 and an average of two or more silicon bonded hydrogen atoms with an alkylene capped glycol or glycol or ether having the formula

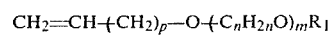

wherein
p is 1 or 2
n is 2 or 3
m has an average value such that the average molecular weight of the polyoxyalkylene chain is in the range 100-400
$R_1$ is hydrogen or alkyl groups of 1-4 carbons.

The reaction is well known from U.S. Pat. Nos. 3,179,622 dated 4-20-65; 2,846,458 dated 8-5-58 and British Pat. No. 955,916 dated 4-22-64. The reaction is illustrated by the preparations 1-4 hereinafter set forth.

The invention is further illustrated but not limited by the following examples and controls:

CONTROL 1

Sodium metaborate $Na_2B_4O_7.5H_2O$ (13.0 g) was added to 960 g of ethylene glycol and stirred until dissolution was complete. A 33⅓% aqueous $NaNO_3$ solution (6.0 g) was added and stirred until well dispersed, followed by 2 gms. of a 50% aqueous solution of sodium tolyltriazole. The pH of the solution was then adjusted with aqueous caustic to 8.45 and 10 gms of a 10% aqueous solution of sodium metasilicate pentahydrate $Na_2SiO_3.5H_2O$) was added with stirring during a 2 minute addition time. The final pH of the antifreeze solution was 10.0 and it contained 1.3% sodium metaborate pentahydrate and 0.1% sodium metasilicate pentahydrate. The solution prepared in this manner was found to have a shelf life as determind by the above accelerated aging test of about 7-10 days which is equivalent to about 7-10 months at room temperature (24° C.)

EXAMPLE 1

The procedure described in Control 1 was repeated except that just before the pH of the solution was adjusted to 8.45, 100 parts per million of dimethyl silicone modified with the allyl methyl ether of dipropylene glycol was added. The modified silicone was made by preparation 1 hereinafter.

The solution was found to have a shelf life of 180 days by the above aging test which is equivalent to about 180 months at room temperature.

In order to compare the corrosion properties of the above formulations, the following tests were run and reported in Table I.

The corrosion test data was obtained by the use of ASTM D1384-70, Corrosion Test for Engine Coolants in Glassware. In this method, specimens of metals typical of those present in automotive cooling systems are totally immersed in the test antifreeze solution with aeration for 336 hours at 190° F. The corrosion inhibitive properties are evaluated on the basis of the weight changes incurred by the specimens. Each test is run in duplicate and the average weight change is determined for each metal. Acceptable minimum weight losses are those less than 20 milligrams.

TABLE I

| Sample | Test Metal | Duplicate Weight Loss (mg) | | Avg. Weight Loss (mg) |
|---|---|---|---|---|
| Control 1 | copper | 3.5, | 3.7 | 4 |
| | solder | 3.0, | 4.5 | 4 |
| | brass | 3.2, | 4.5 | 4 |
| | steel | 0.7, | 0.6 | 1 |
| | cast iron | 3.6, | 3.3 | 3 |
| | aluminum | 3.5, | +1.2 | 1 |
| Example 1 | copper | 1.9, | 1.8 | 2 |
| | solder | 12.7, | 13.0 | 13 |
| | brass | 1.8, | 1.7 | 2 |
| | steel | 0.6, | 1.0 | 1 |
| | cast iron | 1.3, | 0.1 | 1 |
| | aluminum | +6.9, | +1.9 | +4 |

Substantially, the same results were obtained when the modified silicone was added with the sodium silicate solution.

From the above data is seen that while the corrosion properties of the control and Example 1 are about the same, the shelf life of Example 1 is at least about 18 times longer than the control.

CONTROL 2

The procedure of Control 1 was repeated except that the pH was first adjusted to 9.5, then 20 grams of a 10% aqueous solution of sodium metasilicate pentahydrate was added to give a 0.2% solution of the silicate, and the final pH was adjusted to 11.0. Because of the higher silicate level, this formulation was found to have an estimated shelf life of 14 months.

EXAMPLE 2

The procedure of Control 2 was repeated with the addition of 100 p.p.m. of the modified silicone used in Example 1 to give a solution containing 0.2% sodium silicate and 0.01% of the silicone. The estimated shelf life of this formulation was 90 months.

Table II shows the corrosion test data obtained for Controls 1, 2 and Example 2 by the use of ASTM D2570-73, Standard Method for Simulated Service Corrosion Testing of Engine Coolants. In this method, an engine coolant is circulated for 1064 hours at 190° F. at 30 to 35 gal./min. in a flow loop consisting of a metal reservoir, an automotive coolant pump, an automotive radiator, and connecting rubber hoses. Test specimens representative of engine cooling system metals are mounted inside the reservoir, which simulates an engine cylinder block. At the end of the test period, the corrosion inhibiting properties of the coolant are determined by measuring the weight losses of the test specimens and by visual examination of the interior surfaces of the components.

TABLE II

| Sample | Metal | Average Weight loss (mg) |
|---|---|---|
| Control 1* | copper | 2 |
| | solder** | 68 |
| | brass | 1 |
| | steel | +2 |
| | cast iron | +2 |
| | aluminum** | 65 |
| Control 2 | copper | 2 |
| | solder** | 18 |
| | brass | 3 |
| | steel | 11 |
| | cast iron | 2 |
| | aluminum** | +3 |
| Example 2 | copper | 3 |
| | solder** | 47 |
| | brass | 5 |
| | steel | 1 |
| | cast iron | 1 |
| | aluminum** | 15 |

Acceptable minimum weight loss is less than 20 mg (except for solder and aluminum).
*Average of two test runs.
**Acceptable minimum weight loss is less than 60 mg.

The corrosion test data of Table II shows the improvement in corrosion inhibiting properties when the amount of $Na_2SiO_3.5H_2O$ in Control 1 is increased to 0.2%. However, in order to prevent gellation on aging at the 0.2% silicate level the ether modified silicone must be used as a stabilizer as shown in Example 2.

Preparation 1

Into a 500 ml flask was added 50 gms of the allyl monoether of dipropylene glycol, 51.1 gms of a polydimethyl siloxane having an average of two hydrogen siloxane groups and having a molecular weight of 356, 125 gms of toluene and 1.1 gms of a 2 percent solution of $H_2PtCl_2.6H_2O$ in isopropanol. The mixture was stirred and heated under reflux slowly. At 60°-65° C. an exotherm took place which raised the temperature to 110° C. The solution was heated at 106°-108° C. for 2.5 hours under reflux conditions. The product was recovered by vacuum stripping at 60° C. The product was identified as dimethylsilicone modified by the allyl ether of dipropylene glycol.

Preparation 2

The procedure of preparation 1 was repeated using 60 gms of the allyl monoether of tripropylene glycol, 46 gms of the above siloxane, and 1.1 gms of the chloroplatinic acid solution. The product was identified as dimethyl silicone modified by the allyl ether of tripropylene glycol.

Preparation 3

The procedure of preparation 1 was repeated using 65 gms of the allyl monoether of tetrapropylene glycol, 39.9 gms of the above siloxane, and 1.1 gms of the chloroplatinic acid solution. The product was identified as dimethyl silicone modified by the allyl ether of tetrapropylene glycol.

Preparation 4

The procedure of preparation 1 was repeated using 75 gms of the allyl monoether of decaethylene glycol, 26.7 gms of the above siloxane, and 1.1 gms of the chloroplatinic acid. The product was identified as dimethyl silicone modified by the allyl ether of decaethylene glycol.

EXAMPLE 3

The procedure of Example 2 was repeated in triplicate using 100 ppm of the dimethyl silicone modified by the monoallyl ether of dipropylene glycol (preparation 1).

The three solutions were found to have an estimated shelf life at room temperature of 30 months maximum and 25 months minimum.

EXAMPLE 4

The procedure of Example 2 was repeated in triplicate with 100 ppm of the dimethyl silicone modified by the monoallyl ether of tripropylene glycol (preparation 2). The estimated shelf life was found to be 20 months maximum and 15 months minimum.

EXAMPLE 5

The procedure of Example 2 was repeated in triplicate using 100 ppm of the dimethyl silicone modified by the monoallyl ether of tetrapropylene glycol (preparation 3). The estimated shelf life was found to be 20 months maximum and 15 months minimum.

EXAMPLE 6

The procedure of Example 2 was repeated in triplicate using 100 ppm of the dimethyl silicone modified by the monoallyl ether of decaethylene glycol (preparation 4). The estimated life was found to be 20 months maximum and 15 months minimum.

I claim:

1. A gellation resistant aqueous glycol composition comprising
(A) 85 to 98 percent by weight of an alkylene glycol, an alkylene glycol ether, or mixtures thereof,
(B) an effective amount to reduce corrosion of an alkali metal silicate,
(C) an effective amount to improve gellation resistance of a glycol soluble ether modified silicone copolymer comprising the repeating units

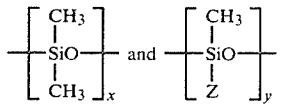

wherein
x has an average value range from 1.8 to 6.8
y has an average value range from 1 to 4
Z has the formula

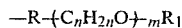

where
n is 2 or 3
m has an average value such that the average molecular weight of the polyoxyalkylene chain is in the range 100–400
R is an alkylene chain of 2–4 carbons and
$R_1$ is selected from the group consisting of hydrogen and alkyl groups of 1–4 carbons
(E) the remainder being water and an effective amount of one or more other corrosion inhibitors.

2. The composition of claim 1 wherein the alkylene glycol is ethylene glycol.

3. The composition of claim 1 wherein the alkylene glycol ether is the monomethyl ether of propylene glycol.

4. The composition of claim 1 wherein the amount of silicone copolymer used ranges from about 0.001 to about 1.0 percent by weight based on the total weight of the composition.

5. A gellation resistant aqueous glycol composition comprising
(A) 85 to 98 percent by weight of an alkylene glycol,
(B) an effective amount to reduce corrosion of an alkali metal borate,
(C) an effective amount to reduce corrosion of an alkali metal silicate,
(D) an effective amount to improve gellation resistance of a glycol soluble ether modified silicone copolymer comprising the repeating units

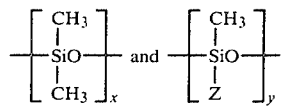

wherein
x has an average value range from 1.8 to 6.8
Y has an average value range from 1 to 4
Z has the formula

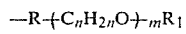

where
n is 2 or 3
m has an average value such that the average molecular weight of the polyoxyalkylene chain is in the range 100–400
R is an alkylene chain of 2–4 carbons and
$R_1$ is selected from the group consisting of hydrogen and alkyl groups of 1–4 carbons
(E) the remainder being water.

6. The composition of claim 5 wherein the alkylene glycol is ethylene glycol.

7. The composition of claim 5 wherein the alkylene glycol ether is the monomethyl ether of propylene glycol.

8. The composition of claim 5 wherein the amount of silicone copolymer used ranges from about 0.001 to about 1.0 percent by weight based on the total weight of the composition.

9. A gellation resistant aqueous glycol composition comprising
(A) 85 to 98 percent by weight of ethylene glycol,
(B) an effective amount to reduce corrosion of an alkali metal borate,
(C) an effective amount to reduce corrosion of an alkali metal silicate,
(D) about 0.001 to 1.0 percent by weight of a glycol soluble ether modified silicone copolymer comprising the repeating units

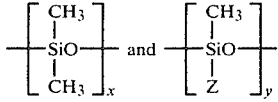

wherein
x has an average value range from 1.8 to 6.8
y has an average value range from 1 to 4
Z has the formula

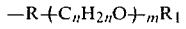

where
- n is 2 or 3
- m has an average value such that the average molecular weight of the polyoxyalkylene chain is in the range 100–400
- R is an alkylene chain of 2–4 carbons and
- $R_1$ is selected from the group consisting of hydrogen and alkyl groups of 1–4 carbons (E) the remainder being water.

10. The composition as set forth in claim 9 wherein the amount of alkali metal borate ranges from about 0.5 to about 2.0 percent by weight and the amount of alkali metal silicate ranges from about 0.025 to 1.0 percent by weight.

11. The composition as set forth in claim 9 wherein the amount of silicone copolymer used ranges from about 0.01 to about 0.025 percent by weight.

* * * * *

UNITED STATES PATENT AND TRADEMARK OFFICE
CERTIFICATE OF CORRECTION

PATENT NO. : 4,287,077
DATED : September 1, 1981
INVENTOR(S) : Philip L. Wing

It is certified that error appears in the above—identified patent and that said Letters Patent is hereby corrected as shown below:

Col. 2, line 14, correct the word "wherein" to ---where---.

Col. 4, line 18, correct the formula to read

Col. 4, line 20, correct the word "wherein" to ---where---.

Col. 4, line 42, add ---(--- before $N_{a2}Si$.

Col. 4, line 48, correct the word "determind" to ---determined---.

Col. 7, line 26, insert the word ---shelf--- before the word life.

Signed and Sealed this

Nineteenth Day of January 1982

[SEAL]

Attest:

Attesting Officer

GERALD J. MOSSINGHOFF
Commissioner of Patents and Trademarks